United States Patent [19]

Freeman

[11] Patent Number: 4,812,806
[45] Date of Patent: Mar. 14, 1989

[54] VEHICLE AND METHOD OF INDICATING ATTAINMENT OF MAXIMUM AXLE LOAD

[76] Inventor: John W. H. Freeman, 21 Cryers Oak Close, Solihull, West Midlands, United Kingdom, B90 4UW

[21] Appl. No.: 80,315

[22] Filed: Jul. 31, 1987

[51] Int. Cl.$^4$ .............................................. B60Q 1/00
[52] U.S. Cl. ............................... 340/440; 364/424.01; 364/571.06; 200/85 R; 340/666; 177/136; 180/290
[58] Field of Search ...................... 340/666, 665, 52 R; 177/136, 137, 141, 163; 73/1 B; 364/571, 424; 180/290; 280/DIG. 1; 200/85 R

[56] References Cited

U.S. PATENT DOCUMENTS

| | | | |
|---|---|---|---|
| 3,109,505 | 11/1963 | Davis et al. | 177/137 |
| 3,891,964 | 6/1975 | Geiger | 200/85 R |
| 4,375,839 | 3/1983 | Manning et al. | 177/137 |
| 4,384,628 | 5/1983 | Jackson | 177/137 |
| 4,456,084 | 6/1984 | Miller | 177/45 |
| 4,728,922 | 3/1988 | Christen et al. | 340/666 |

FOREIGN PATENT DOCUMENTS 2087674B 1/1985 United Kingdom .

Primary Examiner—Joseph A. Orsino
Assistant Examiner—Jill D. Jackson
Attorney, Agent, or Firm—Klarquist, Sparkman, Campbell, Leigh & Whinston

[57] ABSTRACT

A road vehicle has a transducer which provides an output signal representing movement of an axle relative to a chassis of the vehicle. The output signal is compared with a reference signal to produce an indicator signal which is applied to means for indicating the axle load numerically and for providing a visual indication when the maximum prescribed axle load is exceeded. For initial calibration, the reference signal is temporarily substituted for the output signal and the numerical display is adjusted to display in selected units the prescribed maximum load. The output signal is then restored and the vehicle is loaded to subject the axle to the prescribed maximum load. While this load is maintained, the reference signal is varied until the numerical indication of the prescribed maximum load is restored.

6 Claims, 3 Drawing Sheets

VEHICLE AND METHOD OF INDICATING ATTAINMENT OF MAXIMUM AXLE LOAD

BACKGROUND TO THE INVENTION

The present invention relates to the indication in a road vehicle of attainment of a prescribed maximum axle load and to the attainment of a prescribed aggregate axle load.

From my U.K. patent number 2,087,674 issued Jan. 9, 1985, it is known to fit to a road vehicle a position transducer which provides an electrical signal representing deflection of a suspension system of the vehicle and to provide in a cab of the vehicle a control and display unit which receives the output signal from the transducer. Generally, the transducer is associated with a particular axle of the vehicle and the control and display unit is capable of providing an analogue representation of that load and the generation of an alarm signal when the prescribed maximum load is attained. It is also known to present a numerical display of the load to which an axle is subjected.

The position transducer incorporated in the known arrangement comprises a housing which is mounted in a fixed position with respect to a chassis of the vehicle and a shaft which protrudes outside and is rotatable relative to the housing. There is mounted on the shaft inside the housing a disc having windows through which beams of light can pass from light-emitting diodes or other suitable sources to sensing elements, each of which responds to the incidence of light from the corresponding LED to provide an electrical output. These outputs are processed to provide an electrical analogue signal which is fed to the control and indicating unit in the vehicle cab. The shaft of the transducer is connected by a linkage with an axle of the vehicle. When vertical movement of the chassis relative to the axle occurs, the linkage turns the shaft of the transducer and the disc carried thereon. It is necessary to adjust the connection between the linkage and the shaft to ensure that the movement of the chassis relative to the axle which occurs as the maximum axle load is approached is properly represented by the output signal from the transducer and so that the control and indicator unit properly indicates attainment of the prescribed maximum axle load.

Over a period of several weeks or months, during which the vehicle is in use, the behaviour of the suspension system changes somewhat so that the deflection of the suspension system when the maximum prescribed axle load is attained differs from the deflection caused by the same load at the beginning of that period. This results in erroneous indication to the user by the control and indicator unit. Either the maximum axle load is exceeded without the user being aware of this or the user is led to believe that the maximum axle load has been attained when the true load is somewhat less. Repair or replacement of any component of the suspension system also is likely to lead to erroneous indication by the control and indicator unit. To correct such erroneous indication by the known system, it is necessary to adjust the connection between the linkage and the shaft of the transducer. Such adjustment can be effected without great inconvenience in a workshop when the transudcer is first fitted to a vehicle. Subsequent adjustment of the connection between the linkage and the shaft of the transducer is generally inconvenient and is therefore likely to be deferred or not carried out at all.

SUMMARY OF THE INVENTION

According to the present invention, calibration of the axle load indicating means is carried out by providing a reference signal, comparing the transducer output signal with the reference signal and providing an indication of attainment of the prescribed maximum axle load when the output signal bears a predetermined relation to the reference signal, for example is equal to the reference signal, subjecting the vehicle to a load, called herein the maximum load, which imposes on the axle said prescribed load, whilst the vehicle is subjected to the maximum load, varying the reference signal until the output signal bears said predetermined realtion to the reference signal, relieving the vehicle of the maximum load, during subsequent loading of the vehicle providing the reference signal without variation thereof, comparing the output signal from the transducer with the reference signal and, whenever the output signal bears said predetermined relation to the reference signal, providing to the indicator an indicator signal to cause the indicator to provide the maximum load signal to the user.

Means for varying the reference signal can conveniently be provided in the control and indicator unit in the vehicle cab to facilitate recalibration during the service life of the vehicle.

There is also provided in accordance with the invention a control and indicator unit in or for a road vehicle, the unit comprising adjustable reference means for providing a variable reference signal, comparator means for comparing with the reference signal a signal applied to said unit from a displacement transducer and for providing a difference signal representing the difference between the reference signal and the signal from the transducer, an indicator for providing a visual indication of the difference signal and manually operable setting means for setting the reference signal at a selected level.

DESCRIPTION OF THE PREFERRED EMBODIMENT

Figure 1:
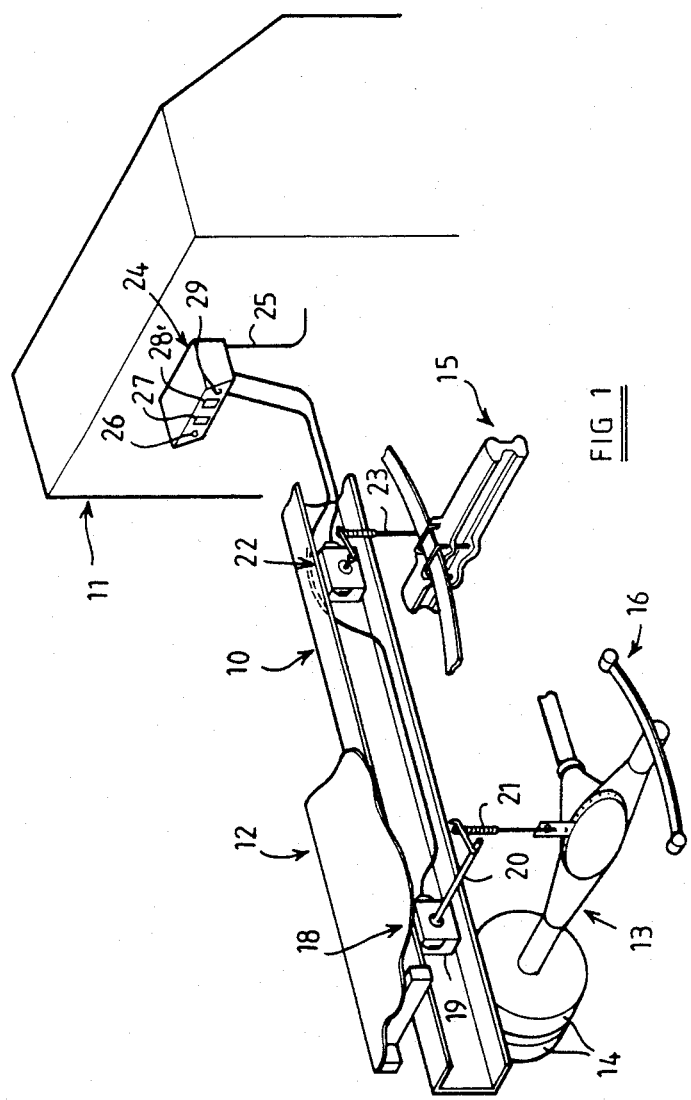
FIG. 1 shows diagrammatically certain parts of a motor road vehicle embodying the present invention.
Figure 2:
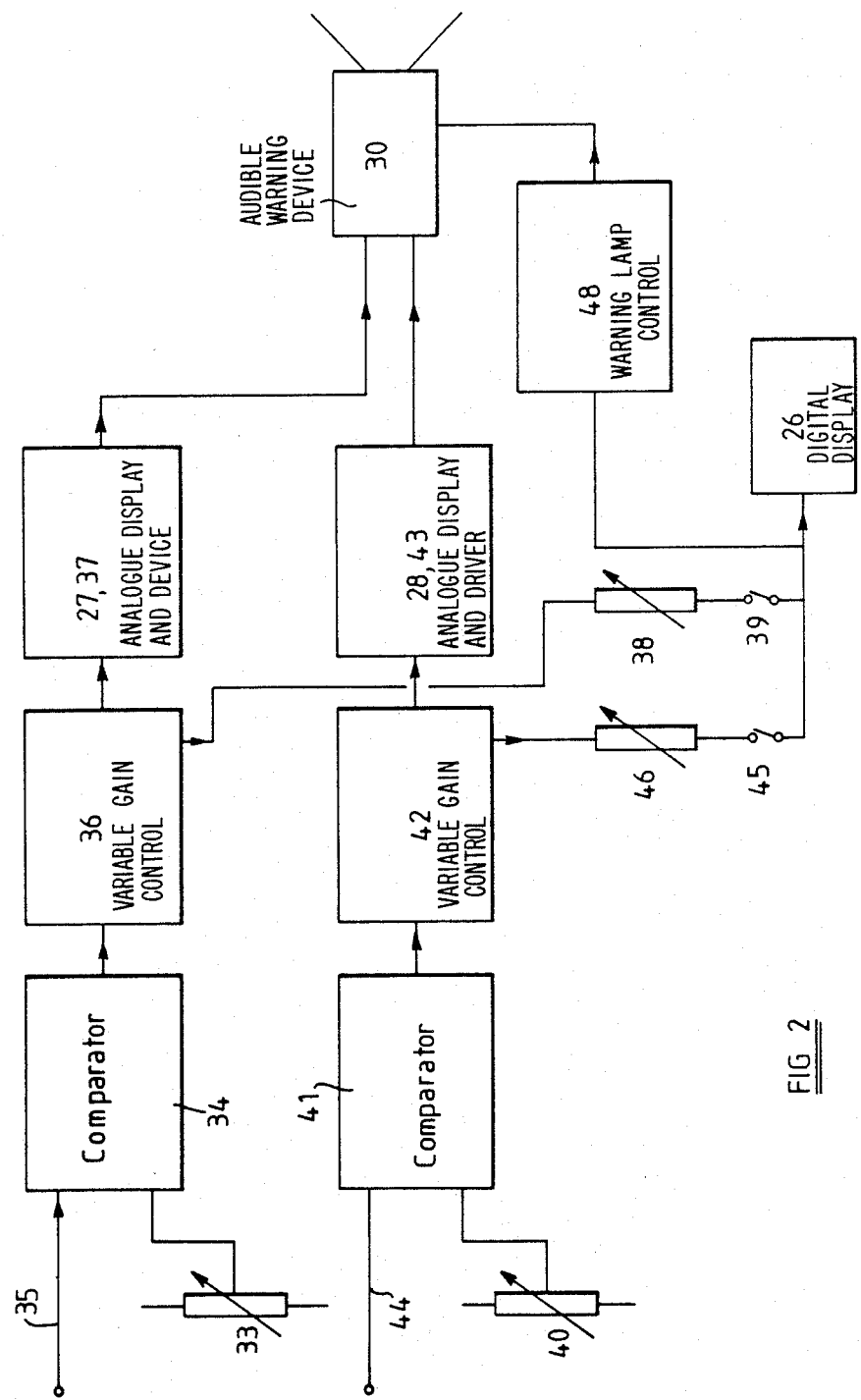
FIG. 2 shows a block diagram of a circuit of a control and indicator unit incorporated in the vehicle of FIG. 1.
Figure 3:
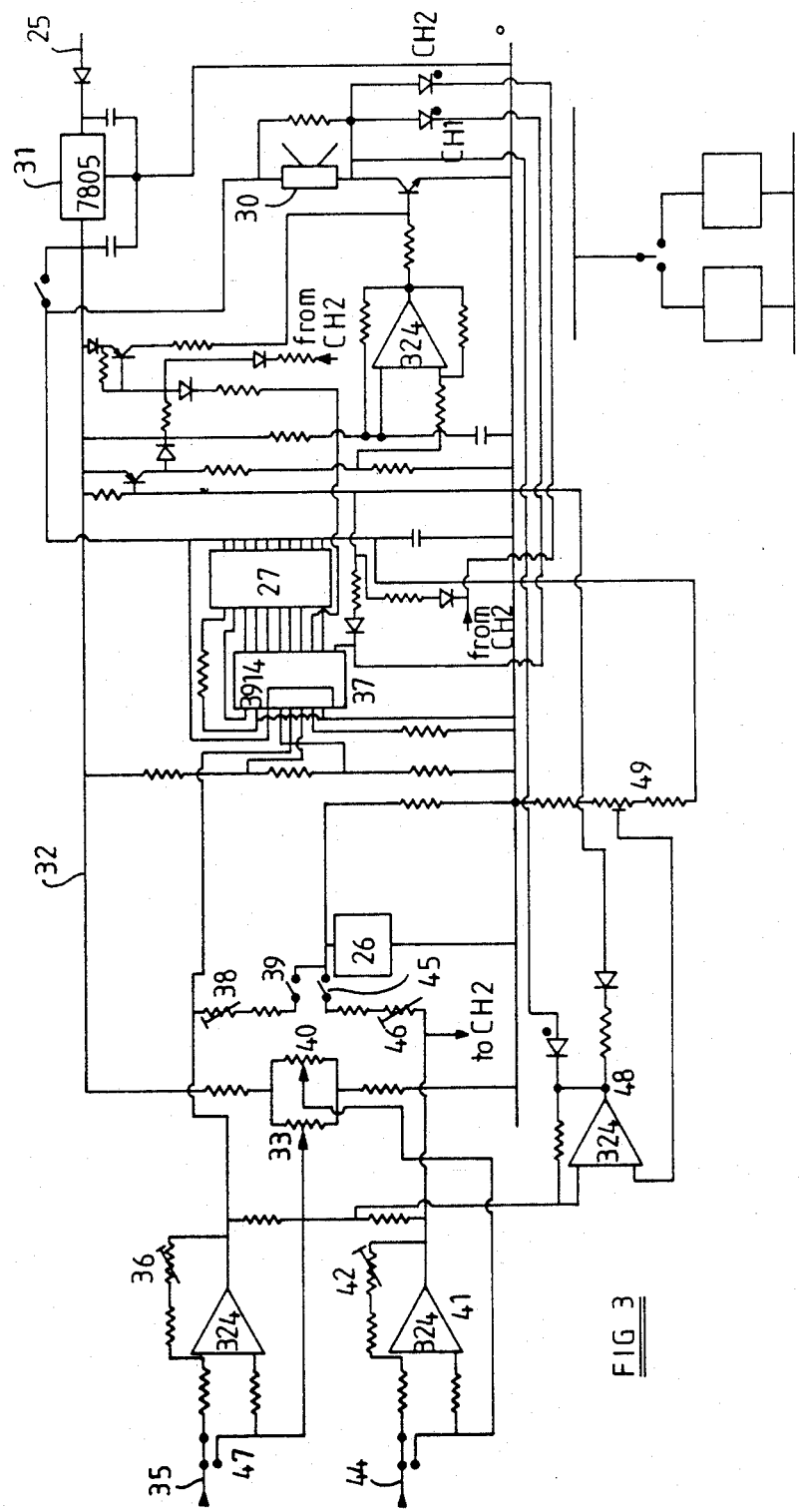
FIG. 3 is a circuit diagram of the control and indicator unit.

The vehicle represented diagrammatically in FIG. 1 is a freightcarrying road vehicle having a chassis 10 on which there is mounted a cab 11, an engine (not shown) and a load-carrying deck 12. The vehicle further comprises a rear axle 13 carrying rear road wheels, two of which are indicated at 14, and a front axle 15 also carrying road wheels (not shown). The chassis is supported from the axles by a suspension system 16 which may be of conventional construction and elements of which are indicated at 17 in the drawing. The suspension system deflects under load to permit upward and downward movement of the chassis relative to the wheels in a known manner.

A transducer 18 is associated with the chassis 10 and with the rear axle 13 for providing an electrical signal representing the position of the chassis relative to the axle. The transducer comprises a hollow body 19 and a shaft 20 which projects horizontally from the body and which is rotatable about its axis relative to the body. Inside the body of the transducer, there is signalling means (not separately shown) for providing a variable output signal representing the rotary position of the shaft 20 relative to the body. The signalling means may be constructed and arranged in a known manner and typically comprises an array of light-emitting diodes disposed adjacent to one face of a disc and a corresponding array of sensor elements disposed adjacent to the opposite face of the disk. The disc is mounted on the shaft 20 in coaxial relation therewith and is provided with windows through which radiation can be transmitted from the diodes to the sensors. The signalling means also includes means for processing outputs generated by the sensors when illuminated by the diodes and for providing an analogue electrical output signal representing the rotational position of the shaft 20 relative to the body 19.

The shaft 20 is connected with the axle 13 by a linkage 21 which causes rotary movement of the shaft when the chassis 10 undergoes vertical movement relative to the axle. The configuration of the linkage is such that when the chassis moves through the full range of permitted movement relative to the axle, the shaft 20 is turned through a part only of one revolution.

There is associated with the front axle 15 and with the chassis 10 a further transducer 22 which may be identical with the transducer 18 and which is connected with the front axle by a linkage 23 arranged in a substantially similar manner to that in which the linkage 21 is arranged.

There is mounted in the cab 11 of the vehicle a control and indicator unit 24 which is connected with the electrical power supply of the vehicle by a conductor 25. The unit 24 includes indicator means for providing to a user of the vehicle a visual indication when the load applied from the chassis 10 to the rear axle 13 attains a prescribed maximum value, when the load applied from the chassis 10 to the front axle 15 attains a prescribed value and when the aggregate load applied from the chassis to the front and rear axles exceeds a further prescribed value.

The indicator of the control and indicator unit 24 includes a digital display device 26, for example a liquid crystal display device, capable of displaying a numerical value of a load in selected units. The indicator further comprises two analogue display devices 27 and 28 comprising respective columns of light-emitting diodes or other light sources which can be energised independently of one another. The indicator also includes at least one further light source 29 which is a warning lamp. In addition to the visual indicating means, the control and indicator unit 24 also includes an audible warning device 30 for emitting an audible warning signal.

The control and indicator unit 24 includes power supply means for providing a stabilised, d.c. supply to rail 32. For providing a reference signal for front axle load indication, there is incorporated in the unit 24 on adjustable potentiometer 33 connected with the rail 32 and with one input of an operational amplifier 34 which constitutes comparator means for front axle load indication. A second input of the amplifier 34 is connected by a conductor 35 with the output of the transducer 22. The amplifier 34 has a feed-back loop including a further potentiometer 36 which constitutes a variable gain control for the amplifier. The output of the amplifier 34 is connected with the input of a driver 37 for energising the diodes of the column 27 in a manner dependent upon the level of the output signal from the amplifier 34. An output is also taken from the driver 37 to the audible warning device 30 so that when all diodes of the column 37 are energised the device 30 is also energised. The arrangement may be such that the device 30 is energised when all but one of the didoes 27 are energised.

The output from the amplifier 34 is also connected with the digital display device 26 via a potentiometer 38 and a switch 39.

For rear axle load indication, there is provided reference means 40, an operational amplifier 41 having a variable gain control 42 and a driver 43 for the LED's 28, all corresponding to and being arranged in a like manner to the reference means 33, amplifier 34, variable gain control 36 and driver 37. One input of the amplifier 41 is connected by a lead 44 with the transducer 18 and the output of the amplifier 41 is connected with the digital display device 26 via a switch 45 and potentiometer 46.

When the transducers 18 and 22 are fitted to the vehicle, the connection between the linkage 21 and the shaft 20 and the connection between the linkage 23 and the shaft of the transducer 22 are adjusted so that the output signals from the transducers are at least approximately equal to the respective reference signals when the vehicle is fully loaded. The potentiometer 38 is then adjusted so that the output from the amplifier 34 when the inputs to that amplifier are equal will cause the device 26 to display numerically the maximum prescribed load which can be applied to the front axle 15. To this end, the reference signal provided by the reference means 33 is applied to both inputs of the amplifier 34, directly to one input and by closing of a switch 47 to the other input. The switch 39 is closed and the potentiometer 38 is then adjusted until the required number is displayed by the device 26. This number can represent the prescribed maximum axle load in any selected units, for example long tons or metric tons. The switches 39 and 47 are then opened. By a corresponding procedure, the potentiometer 46 is adjusted until the device 26 displays numerically the prescribed maximum load which can be applied to the rear axle 13. For convenience, the switch 47 and corresponding switch associated with the reference means 40 may be ganged together.

There is applied to the deck 12 a load such as to subject the front and rear axles of the vehicle to the respective prescribed maximum loads or to loads within 5% of these prescribed maximum loads. The actual loads to which the axles are subjected are measured by means of a weighbridge or weighpads in a known manner. With the load on the deck 12 maintained, the switch 39 is closed and the potentiometer 33 is adjusted until the numerical value presented by the display device 26 is equal to the measured load on the front axle. The switch 39 is then opened, the switch 45 is closed and the potentiometer 42° is adjusted until the number displayed by the device 26 represents the measured load on the rear axle. By this procedure, the reference signals provided by the reference means 33 and 40 are adjusted to values appropriate for the particular vehicle.

The load on the deck 12 is then reduced so that the load to which each axle is subjected is within the range 50% to 90% of the prescribed maximum axle load.

Again, the actual load to which each axle is subjected is measured by means of a weighbridge or by weighpads. The measured loads are preferably within the range 60% to 70% of the prescribed maximum axle loads. With the lesser load on the deck maintained, the switch 39 is closed and the potentiometer 36 is adjusted until the deck 26 displays numerically the lesser load to which the front axle is subjected. The switch 39 is then opened, the switch 45 is closed and the gain control 42 of the amplifier 41 is adjusted until the device 26 displays the lesser load to which the rear axle is subjected. The switch 45 is then opened.

During subsequent use of the vehicle, axle loads as measured by a weighbridge are compared with the axle loads indicated by the display device 26 when the switches 39 and 45 respectively are closed. If a significant discrepancy between the indicated axle load and the measured axle load occurs, recalibration of the control and indicator unit is effected by adjustment of the reference means 33 and/or 40 as heribefore described.

The potentiometers are conveniently provided with adjustment screws which are accessible from the outside of a casing of the control and indicator unit 24. The adjustment screws may be accesible through apertures in a top or bottom of the casing so that the adjustment screws can be concealed from view by a panel of the vehicle. To facilitate adjustment, the unit 24 is removably mounted in an aperture of that panel. The digital display device 26, columns of diodes 27 and 28 and the warning lamp 29 are mounted in respective apertures in a front wall of the casing of the unit.

In a case where the prescribed maximum overall weight for laden vehicle is somewhat less than the aggregate of the prescribed maximum axle loads, outputs from the operational amplifiers 34 and 41 are also applied to a control 48 associated with the warning lamp 29. The control 48 combines the output signals from the amplifiers 34 and 41 and compares the combined signal with a further reference signal, the level of which can be adjusted by a potentiometer 49. With the vehicle loaded to the prescribed maximum gross vehicle weight, the potentiometer 49 is adjusted until the warning lamp 30 is just energised. The control 48 may also be arranged to energise the audible warning device 30, so that an audible warning is provided whenever the warning lamp 29 is energised.

I claim:

1. A method of indicating to a user of a wheeled road vehicle attainment of a prescribed maximum axle load on an axle of the vehicle comprising the steps of:
   (a) mounting on the vehicle an indicator responsive to a predetermined indication signal to provide to the user a maximum load signal,
   (b) mounting in a fixed position with respect to a chassis of the vehicle a transducer which provides an output signal representing movement of an input element of the transducer relative to a body of the transducer,
   (c) mechanically connecting the input element of the transducer to a member of the vehicle relative to which the vehicle chassis moves when a suspension of the vehicle deflects under load, whereby the input element is moved relative to the body of the transducer by an amount representing a deflection of the suspension,
   (d) providing a reference signal,
   (e) comparing the output signal with the reference signal and providing said predetermined indication signal to the indicator when the output signal bears a predetermined relation to the reference signal,
   (f) subjecting the vehicle to a maximum load which imposes on the axle said prescribed load,
   (g) whilst the vehicle is subjected to said maximum load, varying the reference signal until the output signal bears said predetermined relation to the reference signal and said predetermined indication signal is therefore provided to the indicator,
   (h) relieving the vehicle of said maximum load, and
   (i) during subsequent loading of the vehicle, providing the reference signal without variation thereof, comparing the output signal with the reference signal and, whenever the output signal bears said predetermined relation to the reference signal, providing the indication signal to the indicator to cause the indicator to provide the maximum load signal to the user.

2. A method according to claim 1 wherein, after relieving the vehicle of said maximum load,
   (a) the axle is subjected to a lesser load which is within the range 50% to 90% of the prescribed maximum axle load,
   (b) the output signal is compared with the reference signal and there is applied to the indicator a difference signal representing the difference between the output signal and the reference signal,
   (c) the indicator provides a visual indication of the magnitude of the difference signal,
   (d) the difference signal is varied until the visual indication corresponds to said lesser load, and
   (e) the axle is then relieved of said lesser load.

3. A method according to claim 2 wherein said visual indication includes a numerical display representing the magnitude of the difference signal and the emission of light from an electrically energizable source upon the difference signal attaining a pre-selected value, wherein, prior to varying of the reference signal, the reference signal is substituted for the output signal so that said indication signal corresponds to zero difference between the signals compared and wherein the numerical display is then, without change of the indication single, adjusted to display numerically the prescribed maximum axle load in selected units, substitution of the reference signal for the output signal being discontinued before the reference signal is varied until the output signal bears said predetermined relation to the reference signal.

4. A motor road vehicle having:
   (a) a plurality of axles carrying road wheels,
   (b) a chassis,
   (c) a cab on the chassis,
   (d) a suspension system interconnected between the axles and the chassis,
   (e) a transducer comprising a body, an input element movable relative to the body and signalling means for providing a variable output signal representing the position of input element relative to the body, the transducer body being mounted in a fixed position with respect to the chassis and the transducer input element being connected with one of said axles by means for moving the input element relative to the body when that axle moves relative to the chassis,
   (f) a control and indicator unit mounted in the cab, and
   (g) means connecting the signalling means of the transducer with said unit for transmission of the output signal to said unit, wherein said unit comprises:

(h) adjustable reference means for providing a variable reference signal,
(i) comparator means for comparing the output signal with the reference signal and providing a difference signal representing the difference between the output signal and the reference signal,
(j) an indicator for providing a visual indication of the difference signal,
(k) manually operable setting means for setting the reference signal at a selected level, and wherein the comparator means comprises an operational amplifier having a first input connected to the reference means and a second input connected with a two-way switch connected also with the signalling means of the transducer and with the reference means, whereby the switch can be set either to apply the reference signal to both the first and second inputs of the amplifier or to apply the reference signal and the output signal to respective ones of said inputs.

5. A vehicle according to claim 4 wherein there is connected in a feedback loop of operational amplifier a manually adjustable variable gain control contained in said control and indicator unit.

6. A vehicle according to claim 5 wherein said indicator comprises means for providing a numerical display, a plurality of light sources and means for energising one or more of the light sources when a selected load is attained.

* * * * *